(12) United States Patent
Volokh

(10) Patent No.: US 7,393,160 B2
(45) Date of Patent: *Jul. 1, 2008

(54) MILLING CUTTER

(75) Inventor: Vladimir Volokh, Maalot (IL)

(73) Assignee: Kennametal Inc., Latrobe, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/677,801

(22) Filed: Feb. 22, 2007

(65) Prior Publication Data
US 2007/0196186 A1 Aug. 23, 2007

Related U.S. Application Data

(63) Continuation of application No. 09/273,468, filed on Mar. 22, 1999, now Pat. No. 7,186,063.

(30) Foreign Application Priority Data
Mar. 23, 1998 (IL) ........................ 123794

(51) Int. Cl.
B23C 5/10 (2006.01)

(52) U.S. Cl. .............. 407/54; 407/53; 407/61

(58) Field of Classification Search ............ 407/53, 407/54, 59, 61–63, 30; B23C 5/10
See application file for complete search history.

(56) References Cited

U.S. PATENT DOCUMENTS

| 2,966,081 | A |   | 12/1960 | Kallio |   |
|---|---|---|---|---|---|
| 3,003,224 | A | * | 10/1961 | Ribich | 407/54 |
| 4,065,224 | A |   | 12/1977 | Sidall |   |
| 4,212,568 | A |   | 7/1980 | Minicozzi |   |
| 4,681,488 | A |   | 7/1987 | Markusson |   |
| 4,744,705 | A |   | 5/1988 | Imanaga |   |
| 5,049,009 | A |   | 9/1991 | Beck et al. |   |
| 5,160,232 | A |   | 11/1992 | Maier |   |
| 5,443,585 | A |   | 8/1995 | Kawase et al. |   |
| 5,454,670 | A |   | 10/1995 | Noda et al. |   |
| 5,685,670 | A |   | 11/1997 | Satran |   |
| 5,971,672 | A |   | 10/1999 | Hansson |   |
| 6,213,692 | B1 |   | 4/2001 | Guehring et al. |   |
| 6,368,030 | B1 | * | 4/2002 | Sato et al. | 407/53 |
| 7,186,063 | B2 | * | 3/2007 | Volokh | 407/54 |
| 7,214,006 | B2 | * | 5/2007 | Flynn | 407/53 |

FOREIGN PATENT DOCUMENTS

| DE | 3826239 | 2/1990 |
|---|---|---|
| EP | 0532802 | 3/1993 |
| EP | 05109903.4 | 10/2005 |
| FR | 1.190.274 | 10/1959 |
| JP | 61214909 | 9/1986 |
| JP | 0198707 | 8/1990 |
| JP | 07195224 | 8/1995 |

* cited by examiner

Primary Examiner—Monica S. Carter
Assistant Examiner—Sara Addisu
(74) Attorney, Agent, or Firm—Larry R. Meenan

(57) ABSTRACT

A rotary multi-tooth milling cutter, each tooth having a tooth face is provided. The tooth face has at least two sections, a first section nearest the cutting edge having a convex form as viewed in a cross section perpendicular to the cutter axis and a second section in a concave form.

20 Claims, 3 Drawing Sheets

MILLING CUTTER

This application is a continuing application of U.S. patent application Ser. No. 09/273,468, filed on Mar. 22, 1999 now U.S. Pat. No. 7,186,063, which claims priority from Israeli Patent Application No. 123794, filed on Mar. 23, 1998.

FIELD OF THE INVENTION

The present invention relates to a Milling Cutter. More particularly, the invention provides a new and improved tooth form for such cutters, including end mills.

BACKGROUND OF THE INVENTION

Milling cutters are rotatable tools of cylindrical, conical, shaped or disk form, having a plurality of cutting edges. Such cutters are available in many forms, such as plain cylindrical, side milling cutters, face and end mills, formed cutters, and standard and special shaped profile cutters. High speed steel cutters are used for short production runs, carbide cutters are often used for long runs. One form of a cutting insert is described by Satran in U.S. Pat. No. 5,685,670. Similarly for lathe tools, each cutting edge has a clearance angle which is always positive, and a rake angle which is often positive, but may be zero or negative, for example when the cutter tooth is made of a hard grade of tungsten carbide and machining is carried out at high speeds yet without a coolant. Also similar to lathe tools, the recommended relief angles and rake angles depend both on the material to be machined and the material of which the cutter is made.

Much experimentation in the course of about a century has been carried out in an effort to find the best tool tip angle for milling metals. A tool tip that has too small an included nose angle will fail to dissipate heat and quickly reach temperatures causing softening and a sharp reduction of operating life, and/or tool failure. Also, such a tool is liable to vibrate, generate noise and may even break. Conversely a tool tip having too large a cutting angle may fail to cut without the application of high cutting forces. Both too large and too small a tooth tip angle can cause the production of a poor surface finish. Standard textbooks, such as "TOOL ENGINEERS HANDBOOK" and "MACHINERY'S HANDBOOK" provide tables of recommendations for these angles, these being based on much experience and practical tests.

Much research has been carried out to determine the largest possible volume of metal removed before tool failure, in relation to a chosen cutting speed. There are however so many additional factors involved, such as workpiece machinability rating, which itself is a function of both material type and heat treatment, tooth form, cutter size, number of teeth and cutter material, machine tool power available at the cutter and machine tool rigidity, cutter rigidity, coolant type and flow rate, surface finish required, feed rate chosen, and depth and width of cut that results published for one application are difficult to relate to other applications even where the basic type of work, e.g. milling, is the same. It is however clear that tool tip heating Is detrimental to long tool life, and anything that can be done to reduce the temperature of the tool tip will bring its reward in increased tool life.

A type of cutter used extensively is, for example, the cylindrical high speed steel and solid carbide end mill, which usually has helical teeth and a tooth face having a rake angle in the range of for example 150 degrees. The cutting face, as viewed in cross-section is usually a single concave curve extending without break from the tooth root to the cutting edge. A disadvantage of this tooth form is that there occurs extensive rubbing of the chip against the tooth rake face resulting in high power consumption, and the production of more heat than necessary which causes tool softening. It is of course the function of the liquid coolant to remove such heat, but studies have shown that the coolant never reaches the actual cutting edge which is most in need of cooling. In practice the coolant removes heat from the body of the tool and from the workplace, and heat is transferred by conduction from the hot cutting edge to the tool body. Tool steels are only moderately good heat conductors, so there is often a problem of too short a tool life due to a hot cutting edge.

A further problem is often encountered when using an end mill to machine a closed slot in ductile materials such as aluminum, copper, mild steel and brass in their annealed state. Chips do not clear easily out of the space between the milling cutter teeth, despite the fact that, as opposed to lathe tools, milling cutters always produce discrete chips. The conventional tooth shape previously mentioned is not helpful with regard to chip clearance.

SUMMARY OF THE INVENTION

Bearing in mind this state of the art, it is now one of the objects of the present invention to effect an improvement in milling machine cutters, particularly end mills, and to provide a tooth form having a strengthened cutting edge and improved chip disposal.

The present invention achieves the above objects by providing a rotary multi-tooth milling cutter, each tooth having a tooth face comprising of at least two sections, a first section nearest the cutting edge having a convex form as viewed in a cross section perpendicular to the cutter axis.

In a preferred embodiment of the present invention there is provided a milling cutter wherein the length of said first section, as measured substantially in the direction of the cutter center, comprises for example 20% of the total length of the tooth face.

In a most preferred embodiment of the present invention there is provided a milling cutter further provided with a concave chip-breaking section located between said first and said second section.

Yet further embodiments of the invention will be described hereinafter.

In U.S. Pat. No. 5,049,009 there is described and claimed a rotary cutting end mill wherein the improvement claimed for the tooth form relates to a first relief wall having an arcuate land segment and a linear land segment along a substantial portion of the cutting edge. The arcuate land is located adjacent to the cutting edge and terminates at a point along the first relief surface.

In contradistinction thereto, the present invention provides a convex segment to form a face of the cutting edge.

It will thus be realized that the novel tooth form of the present invention serves to strengthen the tooth cutting edge, and is suitable for cutting ferrous and non-ferrous metals. The convex form encourages chip disposal and produces an improved surface finish on the workpiece.

BRIEF DESCRIPTION OP THE DRAWINGS

The invention will now be described with reference to the accompanying drawings, which represent by example preferred embodiments of the invention. Structural details are shown only as far as necessary for a fundamental understanding thereof. The described examples, together with the drawings, will make apparent to those skilled In the art how further forms of the invention may be realized.

DETAILED DESCRIPTION OF THE PRESENT INVENTION

Figure 1A:
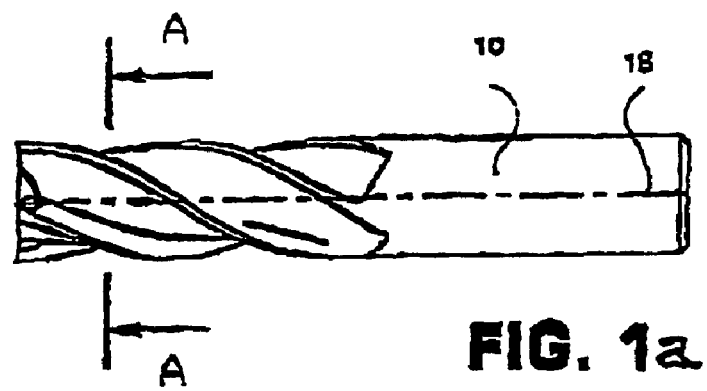
FIG. 1a is an elevational view of an end mill having a tooth form constructed and operative according to a preferred embodiment of the present Invention.

There is seen in FIG. 1a a rotary multi-tooth milling cutter 10. The cutter 10 is an end mill, but the tooth form to be described is applicable to various types of milling cutter.

Figure 1B:
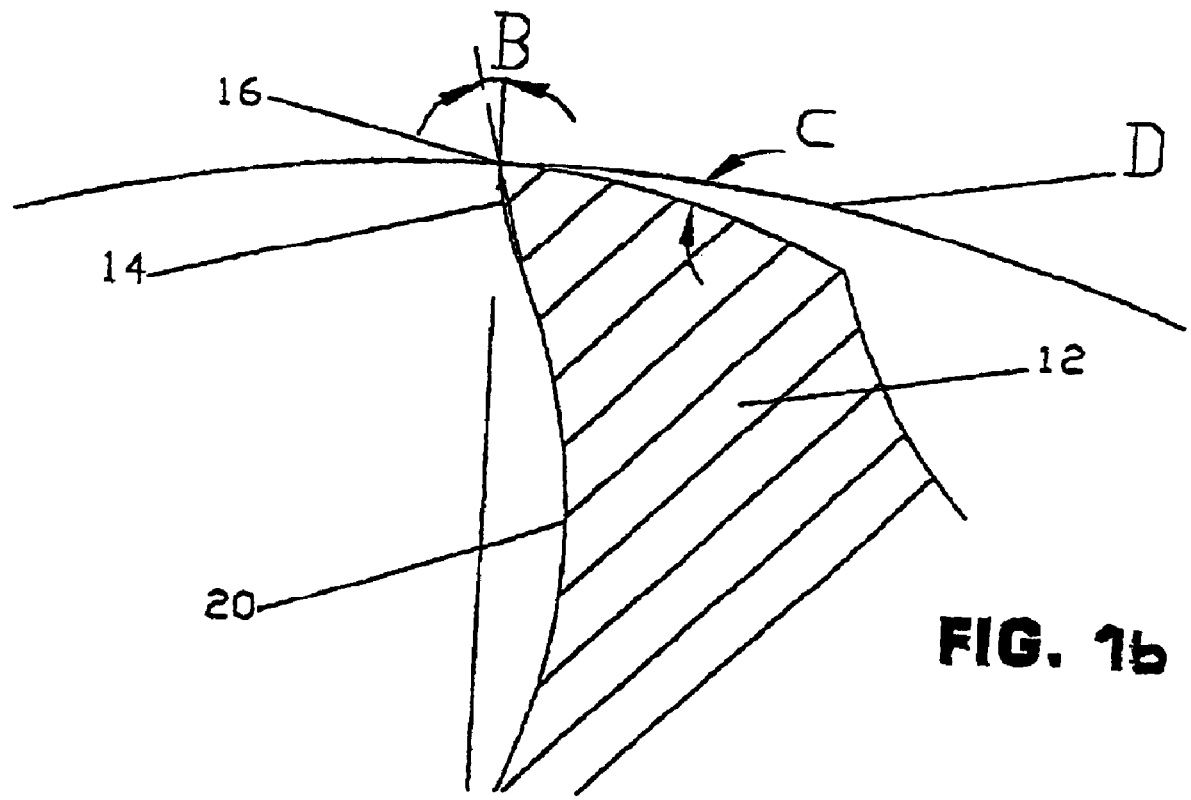
FIG. 1b is an enlarged cross-sectional view of a single tooth taken at AA in FIG. 1a perpendicularly to the cutter axis.
Figure 2:
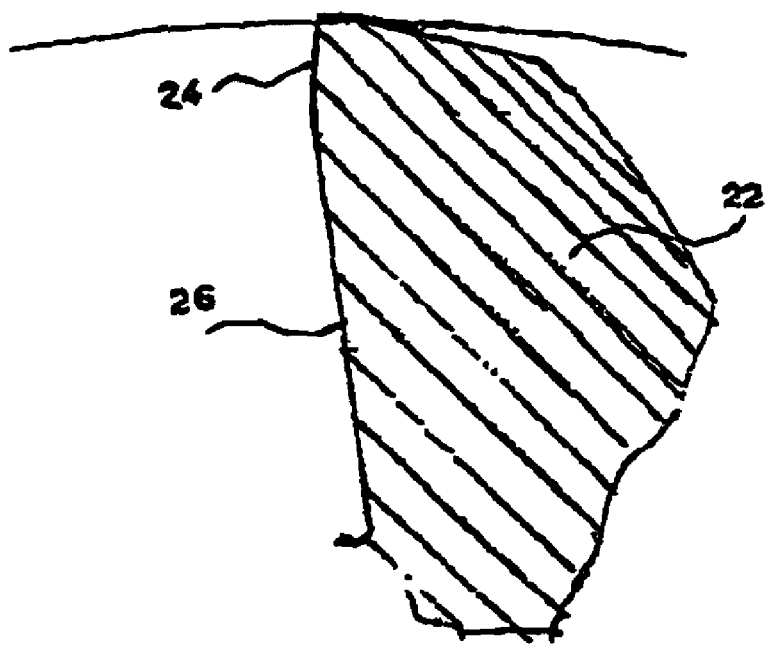
FIG. 2 is a cross-sectional view of a tooth having preferred proportions.

FIG. 1b shows one of the cutter teeth 12 of the same embodiment in enlarged form. The tooth 12 has a tooth face or cutting surface comprising of two sections, a first section 14 nearest the cutting edge 16 having a convex form as viewed in a cross section perpendicular to the cutter axis 18 in FIG. 1a. The second section 20 is concave. The rake angle is indicated at "B" and the relief in angle at "C". Cutting edge path is indicated at "D" Referring now to FIG. 2, there is seen a tooth 22 of a milling cutter, wherein the length of the first section 24, as measured substantially in the direction of the cutter axis, comprises for example 20% of the total length of the tooth face.

The second section 26 is straight, and blends tangentially into the first section 24.

The following example illustrates the above relationships:

EXAMPLE 1

| | |
|---|---|
| Type of cutter | End mill |
| Outside diameter | 10 mm |
| No. of teeth | 4 |
| Total tooth depth | 1.4 mm |
| Length of first section | 0.28 mm |
| Length of second section | 1.12 mm |
| Shape of second section | concave |

Figure 3:
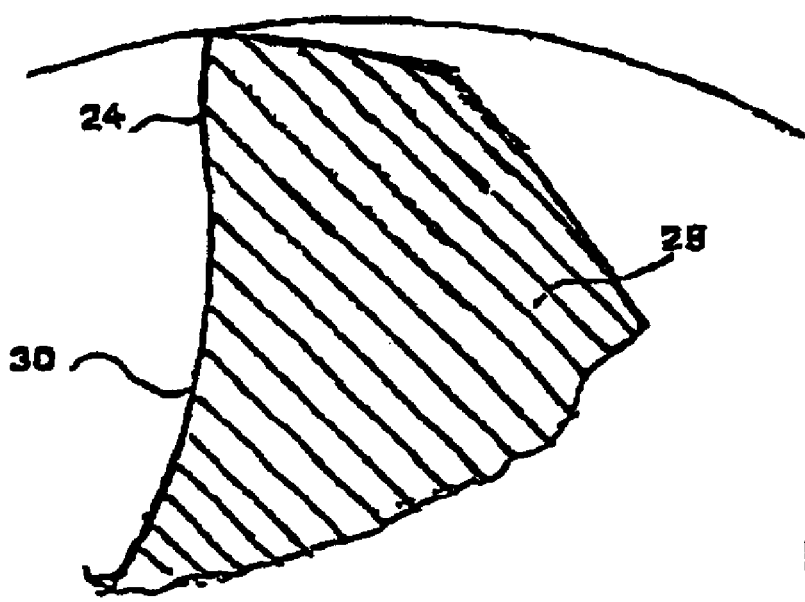
FIG. 3 is a cross-sectional view of a tooth having a concave second section.

FIG. 3 illustrates a tooth 28 of a milling cutter wherein the second section 30 is concave. Otherwise the tooth 28 is similar to that shown in FIG. 2. and numbered accordingly.

Figure 4:
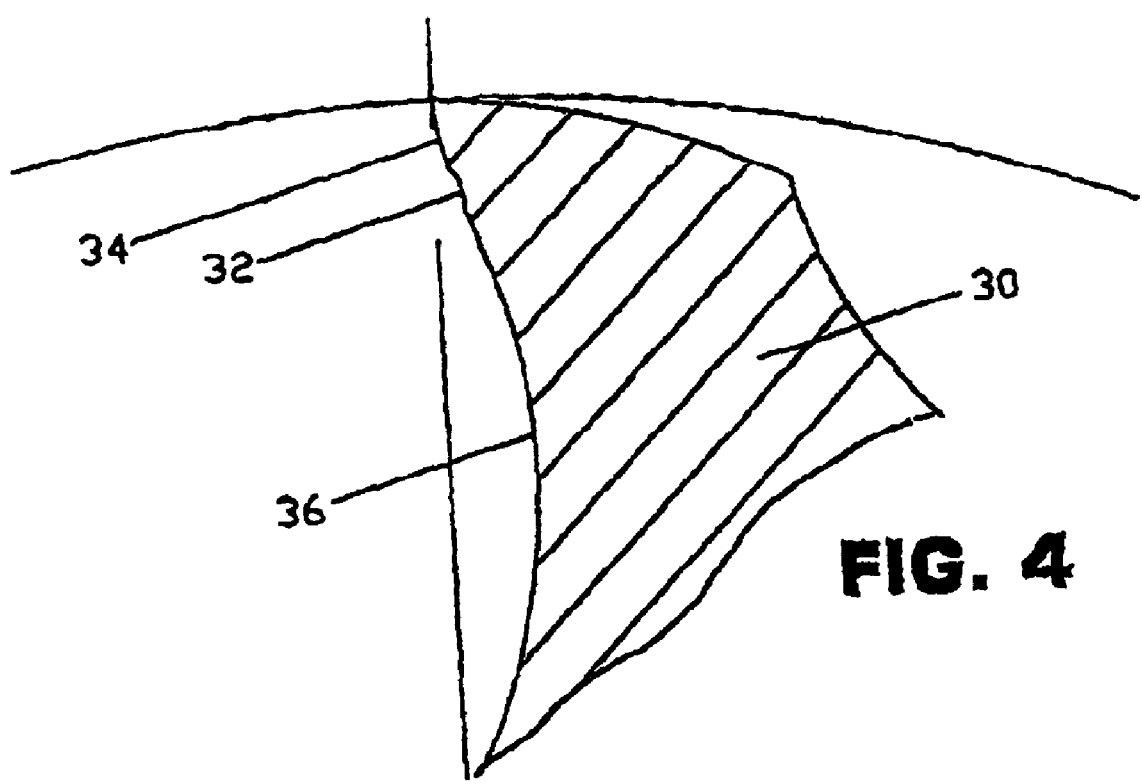
FIG. 4 is a cross-sectional view of a tooth provided with a chip breaker.

Seen in FIG. 4 is a tooth 30 of a milling cutter further provided with a concave chip-breaking section 32. The chip-breaking section 32 is located between the first 34 and the second section 36.

The scope of the described invention is intended to include all embodiments coming within the meaning of the following claims. The foregoing examples illustrate useful forms of the invention, but are not to be considered as limiting its scope, as those skilled in the art will readily be aware that additional variants and modifications of the invention can be formulated without departing from the meaning of the following claims.

The invention claimed is:

1. A rotary, multi-tooth milling cutter having a central cutter axis, said milling cutter comprising:

a plurality of teeth, each comprising a lateral cutting edge being configured and disposed to be rotated about said central cutter axis and being configured to cut generally parallel thereto;

said lateral cutting edge being configured and disposed to cut in a cutting direction along a circular cutting path centered at said central cutting axis;

said lateral cutting edge being configured and disposed to define a non-zero relief angle disposed opposite said cutting direction between said cutting tool and said cutting path;

said plurality of teeth each tooth comprising a first tooth face and a second tooth face;

said first tooth face comprising a surface, said first tooth face surface being disposed to face away from the cutting direction;

said second tooth face comprising a surface, said second tooth face surface being disposed to face toward the cutting direction;

said second tooth face surface being disposed between said lateral cutting edge and said central cutter axis;

said second tooth face surface comprising:

at least a first section and a second section being disposed between said lateral cutting edge and said central cutter axis;

said first section, being disposed to extend from said lateral cutting edge to said second section, comprising a continuously outwardly curved, convex shape being configured and disposed to bulge outwardly in a direction towards the cutting direction; and said second section comprising a continuously inwardly curved, concave shape being configured and disposed to extend inwardly in a direction away from the cutting the direction.

2. The milling cutter as claimed in claim 1, wherein the length of the first section on the tooth face is 20% or less than the length of the tooth face between the cutting edge and central cutter axis.

3. The milling cutter as claimed in claim 1, wherein the first section blends tangentially into the second section.

4. The milling cutter as claimed in claim 1, further including a concave chip-breaking section located between the first and second sections of the tooth face.

5. The milling cutter as claimed in claim 1, wherein the first section is shorter in length than the second section.

6. The milling cutter as claimed in claim 1, comprising one of: HSS, Solid Carbide, and Ceramics.

7. A rotary, multi-tooth milling cutter having a central cutter axis, said milling cutter comprising:

a plurality of teeth, each comprising a lateral cutting edge being configured and disposed to be rotated about the central cutter axis and being configured to cut generally parallel thereto;

said lateral cutting edge being configured and disposed to cut in a cutting direction along a circular cutting path centered at said central cutting axis;

said plurality of teeth each comprising a first tooth face and a second tooth face;

said first tooth face comprising a surface, being disposed to face away from the cutting direction;

said second tooth face comprising a surface, being disposed to face toward the cutting direction;

said second tooth face surface being disposed between said lateral cutting edge and said central cutter axis;

said second tooth face surface comprising:

at least a first section and a second section being disposed between said lateral cutting edge and said central cutter axis;

said first section comprising an outwardly curved, convex shape being configured and disposed to bulge outwardly in a direction towards the cutting the direction; and said second section comprising an inwardly curved, concave shape being configured and disposed to extend inwardly in a direction away from the cutting the direction.

8. The milling cutter as claimed in claim 7, wherein said first tooth surface being configured and disposed to define a non-zero relief angle between said first tooth surface and said cutting path.

9. The milling cutter as claimed in claim 7, comprising one of: HSS, Solid Carbide, and Ceramic.

10. A rotary, multi-tooth milling cutter having a central cutter axis, said milling cutter comprising:

a plurality of teeth, each comprising a lateral cutting edge being configured and disposed to be rotated about the central cutter axis and being configured to cut generally parallel thereto;

said lateral cutting edge being configured and disposed to cut in a cutting direction along a circular cutting path centered at said central cutting axis;

said plurality of teeth each comprising a first tooth face and a second tooth face;

said first tooth face comprising a surface being disposed to face away from the cutting direction;

said second tooth face comprising a surface being disposed to face toward the cutting direction;

said second tooth face surface being disposed between said lateral cutting edge and said central cutter axis;

said second tooth face surface comprising:

at least a first section and a second section being disposed between said lateral cutting edge and said central cutter axis;

said first section, being disposed to extend from said lateral cutting edge to said second section, comprising a continuously outwardly curved, convex shape being configured and disposed to bulge outwardly in a direction towards the cutting direction; and said second section comprising a continuously inwardly curved, concave shape being configured and disposed to extend inwardly in a direction away from the cutting the direction.

11. The milling cutter as claimed in claim 10, wherein the length of the first section on the tooth face is 20% or less than the length of the tooth face between the cutting edge and central cutter axis.

12. The milling cutter as claimed in claim 11, wherein:
the first section blends tangentially into the second section; and
including a concave chip-breaking section located between the first and second sections of the tooth face.

13. The milling cutter as claimed in claim 11, wherein:
the meeting point of said first section and said concave section forming an angle;
the first section is smaller in length than the second section; and
said second section is concave.

14. The milling cutter as claimed in claim 11, comprising one of: HSS, Solid Carbide, and Ceramic.

15. The milling cutter as claimed in claim 10, wherein the first section blends tangentially into the second section.

16. The milling cutter as claimed in claim 10, further including a concave chip-breaking section located between the first and second sections of the tooth face.

17. The milling cutter as claimed in claim 10, wherein the meeting point of said first section and said concave section forming an angle.

18. The milling cutter as claimed in claim 10, wherein the first section is smaller in length than the second section.

19. The milling cutter as claimed in claim 10, wherein said second section is concave.

20. The milling cutter as claimed in claim 10, comprising one of: HSS, Solid Carbide, and Ceramic.

* * * * *